United States Patent [19]

Shimotashiro et al.

[11] Patent Number: 5,124,861

[45] Date of Patent: Jun. 23, 1992

[54] DIGITAL SIGNAL MAGNETIC RECORDING AND PLAYBACK APPARATUS EMPLOYING QUADRATURE AMPLITUDE MODULATION

[75] Inventors: Masafumi Shimotashiro; Toyohiko Matsuta, both of Osaka; Masaaki Kobayashi, Kawanishi; Etsuto Nakatsu; Hiroaki Shimazaki, both of Osaka, all of Japan

[73] Assignee: Matsushita Electric Industrial Co., Ltd., Osaka, Japan

[21] Appl. No.: 329,720

[22] Filed: Mar. 28, 1989

[30] Foreign Application Priority Data

Mar. 28, 1988 [JP] Japan .................................. 63-73616
May 27, 1988 [JP] Japan .................................. 63-130604

[51] Int. Cl.⁵ .......................... G11B 5/09; H04N 5/76
[52] U.S. Cl. .................................... 360/39; 360/65; 375/113
[58] Field of Search ............ 360/39, 55, 65, 66, 360/32, 33.1, 36.1, 36.2, 37.1; 332/103, 160; 375/39, 40, 111, 113; 358/13, 141, 325

[56] References Cited

U.S. PATENT DOCUMENTS

| 4,464,765 | 8/1984 | Shimizu | 375/19 X |
| 4,700,151 | 10/1987 | Nagata | 375/39 X |
| 4,979,052 | 12/1990 | Matsuta | 360/32 X |

FOREIGN PATENT DOCUMENTS

0122127 10/1984 European Pat. Off. .
0206203 12/1986 European Pat. Off. .

OTHER PUBLICATIONS

"An Analytical Approach to the Standardization of Digital Videotape Recorders" by Jurgen K. R. Heitmann; SMPTE Journal, 91, 3, Mar. 1982; pp. 229-232.
"Digital Video Recording: New Results in Channel Coding and Error Protection" by Jurgen K. R. Heitmann; SMPTE Journal, Feb. 1984; pp. 140-144.
"Digital Television Recording with Low Tape Consumption" by John L. E. Baldwin; SMPTE Journal 88: pp. 490-492, Jul. 1979.
"Signal System Design for a Digital Video Recording System" by L. Gallo; SMPTE Journal, 86: pp. 749-756 Oct. 1977.
"An Experimental Digital Video Recording System" by L. M. H. E. Dreissen et al; IEEE Transactions on Consumer Electronics, vol. CE-32, No. 3, Aug. 1986.
"An Experimental Digital VTR Capable of 12-Hour Recording" by C. Yamamitsu; IEEE Transactions on Consumer Electronics, vol. CE-33, No. 3, Aug. 1987.
Patent Abstracts of Japan, vol. 10, No. 35 (E-380) (2092) Feb. 12, 1986, & JP-A-60 192488 (Toshiba K.K.) Sep. 30, 1985, *the whole document*.
Patent Abstracts of Japan, vol. 9, No. 332 (E-370) (2055) Dec. 26, 1985, & JP-A-60 162337 (Fujitsu K.K.) Aug. 24, 1985, *the whole document*.

*Primary Examiner*—Aristotelis Psitos
*Assistant Examiner*—Varsha V. Sheladia
*Attorney, Agent, or Firm*—Pollock, VandeSande & Priddy

[57] ABSTRACT

A digital signal magnetic recording and playback apparatus which is applicable to digital video signals, utilizes quadrature amplitude modulation to produce a recording signal from a digital input signal with a carrier frequency being employed which is less than or equal to than the frequency of a recording system clock signal that is synchronized with the successive data values of the digital input signal. Carrier bursts are periodically inserted into the recording signal with a fixed period, through data inserted by a burst data insertion circuit and the carrier and clock signal are arranged to periodically coincide in phase, with the aforementioned period. The carrier frequency is made equal to the clock frequency multiplied by a factor (n/m), where n and m are integers and n < m. During playback, time information obtained from the bursts is used to mutually phase-relate recovered clock and carrier signals.

8 Claims, 11 Drawing Sheets

FIG. 2 (A)
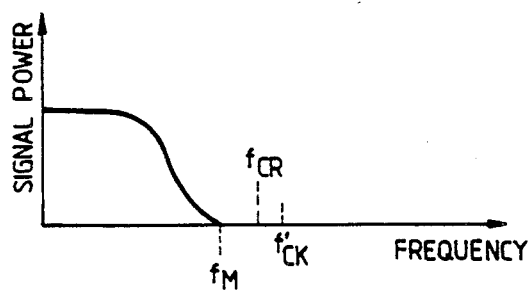
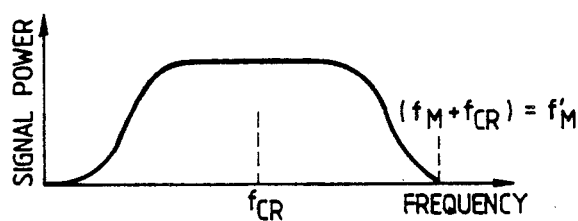
FIG. 2 (B)
FIG. 2(C)
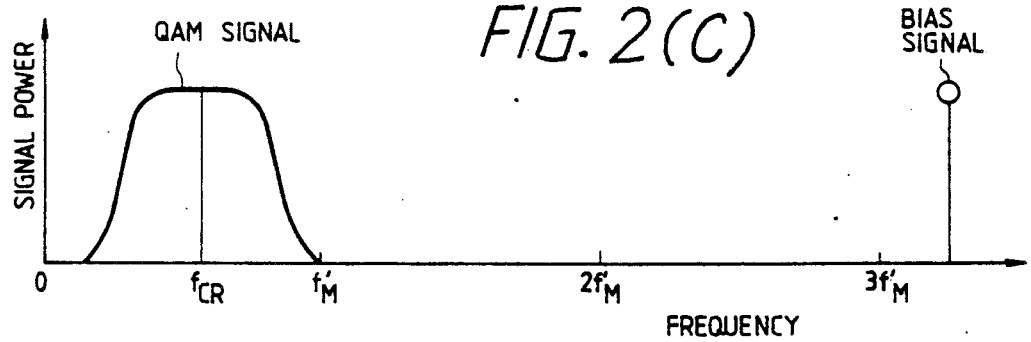

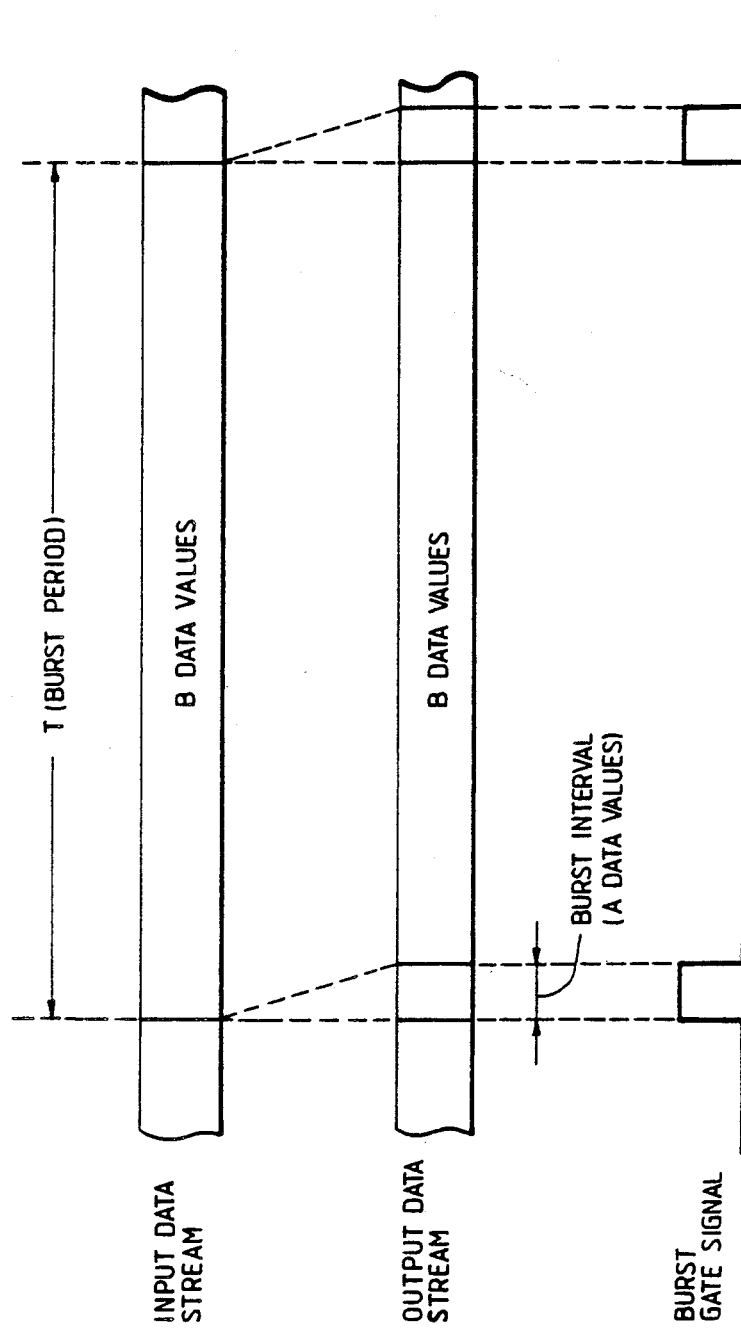

DIGITAL SIGNAL MAGNETIC RECORDING AND PLAYBACK APPARATUS EMPLOYING QUADRATURE AMPLITUDE MODULATION

BACKGROUND OF THE INVENTION

The present application is related to a U.S. patent application with the title "Digital Signal Magnetic Recording/Reproducing Apparatus", the applicants being Toyohiko Matsuda, Masafumi Shimotashiro, and Masaaki Kobayashi. The filing data is Sep. 29, 1988, and the serial number is not yet known.

FIELD OF APPLICABLE TECHNOLOGY

The present invention relates to a digital signal magnetic recording and playback apparatus, and in particular to a digital signal magnetic recording and playback apparatus which is applicable as a digital video tape recorder (DVTR).

PRIOR ART TECHNOLOGY

Various proposals have been made in the prior art for providing a digital signal magnetic recording and playback apparatus which would be capable of application to digital video signal recording. Such prior art proposals utilize various forms of baseband modulation for converting an input digital signal to a recording signal. The types of proposed baseband modulation include NRZ modulation, which has the advantage of a low amount of DC component in the recording signal (as proposed for example by J. K. R. Heitmann; "An Analytical Approach to the Standardization of Digital Videotape Recorders": SMPTE J., 91, Mar. 3, 1982, or by J. K. R. Heitmann; "Digital Video Recording, New Results in Channel Coding and Error Protection": SMPTE J., 93: 140-144, Feb., 1984. Another such proposal is to use the 8-10 block code, for example as described by J. L. E. Baldwin; "Digital Television Recording with Low Tape Consumption": S..MPTE J., 88: 490-492, Jul. 1979. Another proposal is to use the Miller-squared ($M^2$) code, for example as described by L. Gallo; "Signal System Design for a Digital Video Recording System": SMPTE J., 86: 749-756, Oct. 1977. Use of the 3-level partial response method has also been proposed for such baseband modulation.

However if such baseband modulation is used to obtain a recording signal for the recording and playback apparatus, since the recording and playback signals are bi-level signals, the efficiency of utilizing the recording/playback system frequency bandwidth (i.e. the maximum bit rate per unit of bandwidth) is low. For example, assuming that the overall roll-off factor of filter processing applied in the recording and playback systems (to satisfy the Nyquist criterion for minimizing intersymbol interference) is 0.5, then the frequency band utilization efficiency is only 1.33 bits/second/Hz. As a result, the tape consumption will be high, making it difficult to attain long recording times.

There have therefore also been prior art proposals for improving such baseband modulation types of DVTR system through increasing the maximum bit rate that can be recorded, e.g. by expanding the system bandwidth, by increasing the number of recording channels, or by increasing the relative tape/head speed. However if the system bandwidth is increased, then the signal-to-noise (S/N) ratio of the playback signal will deteriorate, and it is found that no useful increase in the recording rate can be achieved by this method. If the number of recording channels is increased, then the recording track width must be narrowed accordingly, which again leads to deterioration of the S/N ratio. If the relative tape/head speed is increased, then an increase in tape consumption will result. Such prior art proposals are for example given by L. M. H. Dreissen et al; "An Experimental Digital Video Recording System": IEEE Trans. on CE, CE-32, No. 3, pp 362-371, Aug. 1986, or by C. Yamamitsu et al; "An Experimental Digital VTR Capable of 12-hour Recording: IEEE Trans. on CE, CE-33, No. 3, pp 240-248, 1987.

An apparatus in which quadrature amplitude modulation is used to produce a recording signal, to attain a higher recording bit rate than is possible with baseband signal recording, has been proposed in a U.S. patent application entitled "Digital Signal Magnetic Recording/Reproducing Apparatus" by Matsuda et al, (they are three of the assignees of the present invention) with a filing date of Sep. 29, 1988. However since insufficient consideration is given in that application to the relationship between the carrier frequency used for modulation and the symbol rate of the digital signal to be recorded, the carrier frequency cannot be made sufficiently low to obtain a high level of S/N ratio.

SUMMARY OF THE INVENTION

It is an objective of the present invention to provide a new digital signal magnetic recording and playback apparatus in which the recording signal is a modulated signal occupying a frequency band that is optimized with respect to the magnetic recording/playback system. The apparatus enables a higher efficiency of frequency utilization and higher recording rate than has been possible with prior art recording forms of digital signal magnetic recording and playback apparatus which utilize baseband modulation to constitute a recording signal.

A digital signal magnetic recording and playback apparatus according to the present invention utilizes a recording signal that is obtained through carrier modulation based on an input digital signal, preferably by quadrature amplitude modulation (QAM), with a relationship established between the frequency of an input clock signal that is synchronized with successive data values of the input digital signal and the frequency of the carrier used for modulation, such that the carrier frequency is equal to the input clock signal frequency multiplied by a factor (n/m), where n and m are positive integers and $n \leq m$. As is well known, use of QAM enables a baseband digital signal to be transferred, as a modulation signal, over a transmission system having a bandwidth that is less than the symbol frequency of the digital signal. Alternatively stated, this enables the effective data rate that can be transferred over a specific transmission system bandwidth to be made considerably higher than would be possible by baseband transmission. However use of QAM requires that the transmission system have high linearity and a low S/N ratio. For that reason it has not been possible in the prior art to apply QAM to digital recording of a high frequency digital signal, e.g. for recording a digital video signal, since a satisfactory bit error rate could not be attained for the digital signal obtained on playback, due to noise generated by the magnetic recording and playback process and non-linearity of that process. However with the present invention, a modulated recording signal is produced which occupies a frequency band that is sufficiently low to enable a satisfactory value of S/N ratio to be obtained for the playback signal. In addition, a high frequency bias signal is superimposed on the recording signal, enabling a high degree of system linearity to be achieved. The lowering of the frequency band of the recording system is achieved by making the frequency of the carrier lower than the symbol frequency (i.e. input clock frequency) of the input digital signal. In the prior art this has not been possible, due to the difficulty of recovering a clock signal during playback which will be correctly time-axis related to the two multi-level analog signals which are obtained by demodulation of the QAM playback signal. This correct relationship is essential, since analog-to-digital processing for converting the demodulated playback signals to recover the original digital signal must be based upon a clock signal having such a relationship. With the present invention, this problem is overcome by periodically inserting carrier bursts of fixed phase and amplitude into the recording signal, and by generating the carrier such as to periodically attain phase coincidence with the clock signal of the recording system at fixed time points within each burst, so that the carrier and clock signal periodically attain phase coincidence with a fixed period which is equal to the burst period. During playback, the recovered bursts provide timing information which is used for establishing this periodic phase coincidence relationship between a playback clock signal and the demodulated QAM signals, so that accurate A/D conversion can be achieved using this playback clock signal.

More specifically, a digital signal magnetic recording and playback apparatus according to an embodiment of the present invention comprises a recording system and a playback system, in which the recording system receives a first digital signal expressing successive data values and a first clock signal synchronized with the first data values and having a fixed frequency ($f_{CK}$), the recording system comprising:

means for converting the input digital signal to a second digital signal having a set of fixed data values inserted during each of periodically occurring burst intervals, the burst intervals occurring with a fixed burst period (T), and for producing a second clock signal having a frequency ($f'_{CK}$) which is identical to a symbol frequency of the second digital signal;

means for converting each of successive data values of the second clock signal to two multi-level analog signals;

means for generating a carrier having a frequency ($f_{CR}$) which is fixedly related to the second clock signal frequency ($f'_C$) as $f_{CR}=(n/m) \cdot f'_{CK}$, where n and m are respective positive integers and n is less than or equal to m, the carrier being generated with a fixed phase relationship t the second clock signal whereby that the carrier and digital signal periodically attain phase coincidence with a period identical to the burst period (T), at fixed time points within respective burst intervals;

quadrature amplitude modulation means controlled by the second clock signal for executing quadrature amplitude modulation of the carrier by the two multi-level analog signals to produce a quadrature amplitude modulation signal as a recording signal; and magnetic recording means for recording the recording signal on a magnetic recording medium.

A digital signal magnetic recording and playback apparatus according to a second embodiment of the invention comprises a recording system and a playback system, in which the recording system receives a first digital signal expressing successive data values, and a first clock signal synchronized with the successive data values of the input digital signal and having a fixed frequency ($f_{CK}$), the recording system comprising:

means for converting the input digital signal to a second digital signal having a set of fixed data values inserted during each of periodically occurring burst intervals, the burst intervals occurring with a fixed burst period (T), and for producing a second clock signal having a fixed frequency ($f'_{CK}$), which is synchronized with successive data values of the second digital signal;

means for converting each of successive data values of the second digital signal to two multi-level analog signals;

means for generating a carrier having a frequency ($f_{CR}$) which is fixedly related to the second clock signal frequency ($f'_C$) as $f_{CR}=(n/m) \cdot f'_{CK}$, where n and m are respective positive integers and n is less than or equal to m, the carrier being generated with a fixed phase relationship to the second clock signal whereby the carrier and digital signal periodically attain phase coincidence with a period identical to the burst period (T), at fixed time points within respective burst intervals;

quadrature amplitude modulation means controlled by the second clock signal for executing quadrature amplitude modulation of the carrier by the two multi-level analog signals to produce a quadrature amplitude modulation signal as a recording signal;

means for generating a bias signal;

means for adding the bias signal to the quadrature amplitude modulation signal to obtain a recording signal; and magnetic recording means for recording the recording signal on a magnetic recording medium.

Due to the above configuration for a digital signal magnetic recording and playback apparatus according to the present invention, a recording signal can be obtained in which the DC component is entirely eliminated. Furthermore due to the use of QAM modulation, the efficiency of frequency band utilization is increased, by comparison with a baseband recording method. In addition, due to the fact that a relationship $f_{CR}=(n/m) \cdot f'_{CK}'$ is established, where $f_{CR}$ is the carrier frequency of modulation executed to obtain a recording signal and $f'_{CK}'$ is the frequency of a clock signal that is synchronized with successive data values of the recording signal, and a burst of the carrier is periodically inserted in the recording signal with a period $T=k \cdot n/f_{CR}$, expressing respective timings at which the carrier and clock signal coincide in phase, the clock signal can be recovered together with the carrier by utilizing the burst component in the playback signal. This feature enables the carrier frequency to be made lower than the clock signal frequency, so that a recording frequency band can be utilized which provides optimum S/N ratio from a magnetic recording/playback system.

Alternatively, if the upper frequency limit of the recording frequency band is determined as the maximum value with regard to allowable S/N ratio or allowable BER (bit error rate) limitations, then the recording rate can be effectively increased to a substantially higher value than has been possible with a digital signal magnetic recording and playback apparatus employing baseband modulation.

In addition, a digital signal magnetic recording and playback apparatus according to the present invention preferably employs bias recording, whereby a high-frequency bias signal modulates the recording signal. As a result, non-linearity which arises in a magnetic recording/playback system can be substantially reduced, and hence a deterioration of the overall S/N ratio of the apparatus resulting from the effects of such non-linearity can be reduced.

BRIEF DESCRIPTION OF THE DRAWINGS

FIGS. 2(A), (B) and (C) are graphs illustrating frequency relationships in the embodiment of FIG. 1;

FIG. 3(B) is a diagram for illustrating burst insertion timing for the circuit of FIG. 3(A);

DESCRIPTION OF PREFERRED EMBODIMENTS

Figure 1:
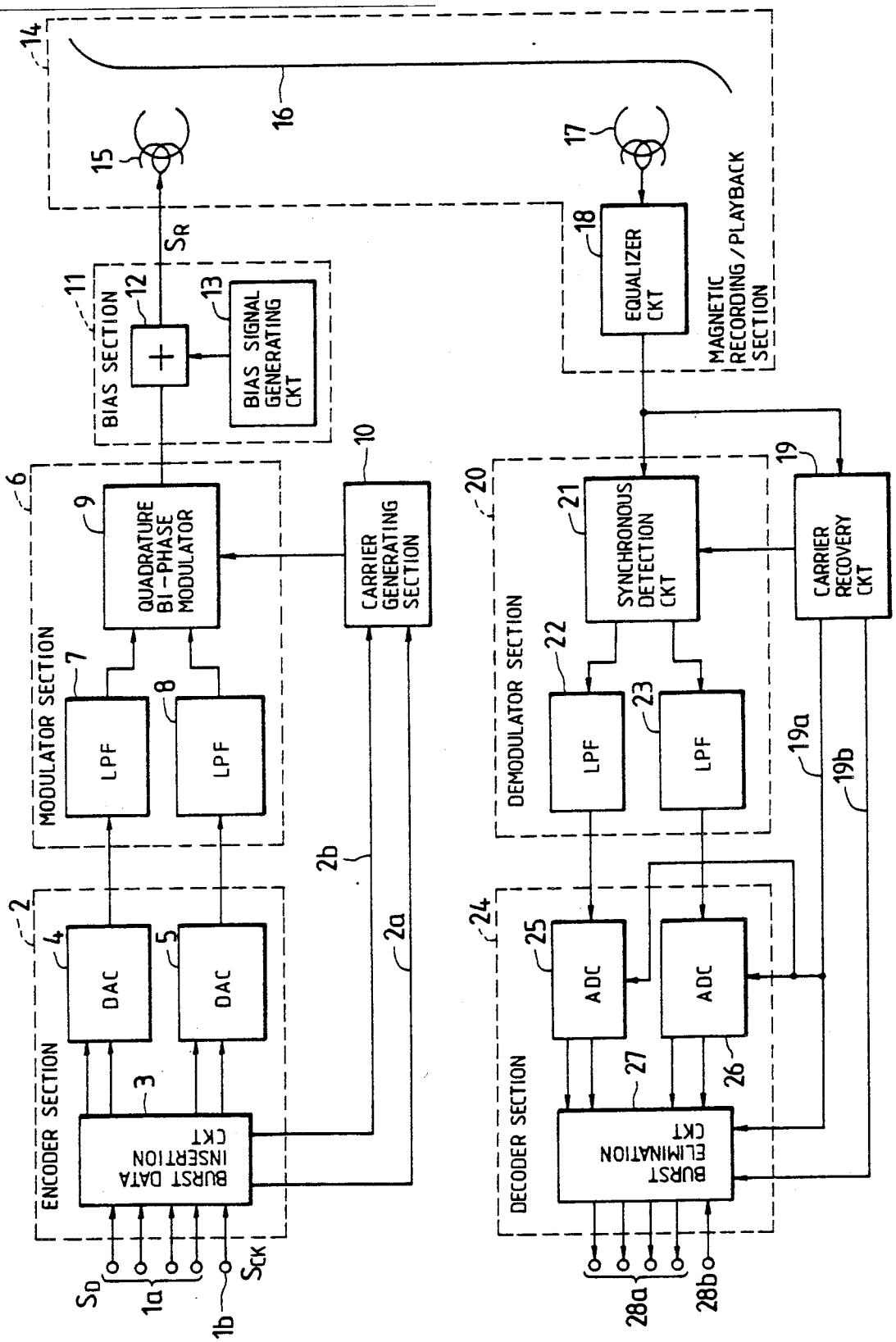
FIG. 1 is a general block circuit diagram of a first embodiment of a digital signal magnetic recording and playback apparatus according to the present invention.

FIG. 1 is a general block circuit diagram of a first embodiment of a digital signal magnetic recording and playback apparatus according to the present invention. This has a recording system including an encoder section 2, a modulator section 6, a carrier generating section 10 and a bias section 11, and a playback system including a demodulator section 20, a carrier recovery circuit 19, and a decoder section 24. A baseband digital signal $S_D$ expressing successive parallel 4-bit data values is applied to four parallel data input terminals 1a of an encoder section 2, while a corresponding input clock signal $S_{CK}$ that is synchronized with the successive data values and hence has a frequency $f_{CK}$ that is identical to the symbol frequency of the input digital signal is applied to an input terminal 1b of the encoder section 2. The encoder section 2 includes a burst insertion circuit 3 which separates the input 4-bit parallel digital signal into two 2-bit parallel digital signals, which contain periodically inserted burst data for causing corresponding bursts of a carrier to be inserted into the recording signal by a quadrature bi-phase modulator 9 as described hereinafter. These two 2-bit parallel digital signals are applied to D/A converters 4 and 5 respectively within the encoder section 2, whereby each 2-bit data value is converted to a bipolar pulse having one of four possible levels. A train of such pulses will be referred to herein as a multi-level analog signal. These levels will be assumed to be 1, 0.5, −0.5 and −1 respectively (i.e. respective voltage levels expressed in predetermined units). Thus a total of 4×4, i.e. 16 different combinations of these levels can be produced. In the process of inserting the burst data, the parallel digital signals are resynchronized with a new clock signal which is generated within the burst insertion circuit 3 and is designated as $S'_{CK}$, having a frequency $f'_{CK}$. This is supplied over a line 2b, together with a burst timing signal (consisting of successive pulses which are synchronized with timings of periodic insertion of the aforementioned burst data) supplied over a line 2a, to a carrier generating circuit 10. The carrier generating circuit 10 generates a carrier wave (referred to in the following simply as "carrier") having a frequency $f_{CR}$, with a relationship $f_{CR} = (n/m) \cdot f'_{CK}$, where n is less than or equal to m and each of n and m is a positive integer.

Figure 3A:
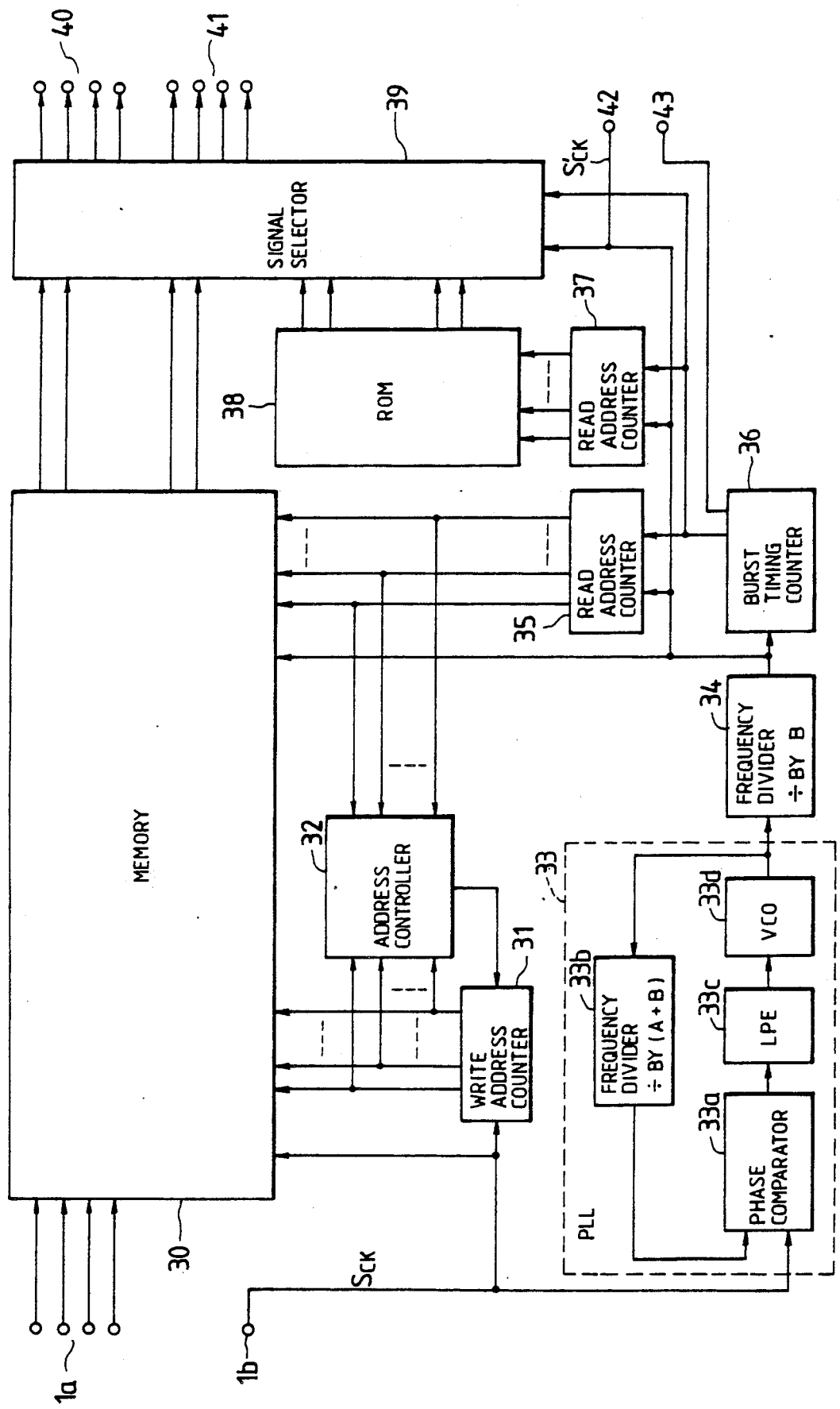
FIG. 3(A) is a block circuit diagram of a burst insertion circuit in the embodiment of FIG. 1.

FIG. 3(A) is a block circuit diagram of a specific configuration for the burst insertion circuit 3 of FIG. 1, and FIG. 3(B) is a diagram for illustrating the manner in which burst data, for producing periodic carrier bursts in the QAM modulation recording signal, are inserted into the digital data stream. These carrier bursts are produced periodically with a burst period designated as T, during respective burst intervals. Designating the number of 4-bit data values of the input digital signal that occur within each burst period T as B, and the number of data values which are inserted within each burst interval as A, the input digital signal can be represented as shown in the top portion of FIG. 3(B), with the corresponding output digital data stream from the burst insertion circuit 3 being illustrated immediately below. The symbol frequency (number of data values/second) of the incoming digital signal is B/T, which will be designated as $f_0 \cdot B$, i.e. this is the frequency $f_{CK}$ of the incoming clock signal $S_{CK}$, while the symbol frequency of the output digital signal from the burst insertion circuit 3 is (A+B)/T, i.e. $f_0 \cdot (A+B)$.

Referring to FIG. 3(A), the input clock signal $S_{CK}$ is applied to a clock input of a "write address" counter 31, and to a phase comparator 33a within a PLL 33. The PLL 33 is formed of a VCO (voltage controlled oscillator) 33d whose output signal is applied to a frequency divider 33b having a division ratio of (A+B), with the resultant frequency-divided signal being supplied to the other input of the phase comparator 33a. A phase error signal produced from the phase comparator 33a is transferred through a loop filter 33c to apply a frequency control voltage to the VCO 33d. Designating the input clock signal frequency as $f_0 \cdot B$ as described above, the frequency of the VCO 33d is locked at a value $f_0 \cdot B \cdot (A+B)$. This signal from the VCO 33d is transferred through a frequency divider 34 having a division ratio equal to B, to obtain a new clock signal designated as $S'_{CK}$, having a frequency of $f_0 \cdot (A+B)$. Successive 4-bit data values of the input digital signal are written into a memory 30 at successive addresses designated by the "write address" counter circuit 31, in synchronism with the input clock signal $S'_{CK}$. These addresses are also supplied to an address controller 32. The clock signal $S'_{CK}$ from the frequency divider 34 is also supplied to a "read address" counter 35, a burst timing counter 36, a "read address" counter 37 and a signal selector 39, as well as to a "read clock" input of the memory 30. The burst timing counter 36 counts the clock signal pulses to periodically produce burst timing signal pulses as described above, with period T, together with burst gate signal pulses. The duration of the burst interval corresponding to the pulse width of these burst gate signal pulses, and each burst timing signal pulse occurs at a fixed time following the start of a burst gate signal pulse. Thus the burst gate and burst timing signal pulses respectively express burst interval duration information and burst timing information. The value of a carrier frequency $f_{CR}$, to be used in QAM modulation as described hereinafter, has been predetermined as related to the frequency $f'_{CK}$ of the clock signal $S'_{CK}$ such that $f_{CR}=(n/m).f'_{CK}$ as described hereinabove, where $n \leq m$. The value of the burst period T is predetermined as $k.m/f'_{CK}$, which is equal to $k.n/f_{CR}$, where k is a positive integer. The burst gate signal from the burst timing counter 36 is applied to respective control inputs of the "read address" counter 35, the "read address" counter 37 and the signal selector 39, while a burst timing signal produced from the counter 36 is supplied to an output terminal 43. The "read address" counter 35 and "read address" counter 37 supply address values to the memory 30 and to a ROM 38 respectively. Control is executed such that during each burst interval, the "read address" counter 35 is held inoperative, while successive addresses are outputted from the "read address" counter 37 in synchronism with the clock signal $S'_{CK}$. At all other times, the "read address" counter 37 is held inoperative, and successive 4-bit stored data values are read out from the memory 30 in synchronism with the clock signal $S'_{CK}$. Each of these is thereafter processed as two separate 2-bit data values, which are transferred through the signal selector 39 to the D/A converters 4 and 5 respectively. A ROM 38 has 4-bit data values each of which is binary "1111" stored at successive addresses therein.

The addresses produced from the "read address" counter 35 are also supplied to the address controller 32, which controls the "write address" counter circuit 31 such as to prevent conflicts from arising between memory read and write operation timings.

The operation is as follows. During each interval between successive burst intervals, 4-bit data values that have been stored in the memory 30 are successively read out in synchronism with the read clock signal $S'_{CK}$, and each is transferred as two pairs of 2-bit values through the signal selector 39 to the D/A converters 4 and 5. During each burst interval, successive 2-bit data values of binary "11" are transferred from the ROM 38 through the signal selector 39 to each of the D/A converters 4 and 5. Each of the D/A converters 4 and 5 is configured to produce the following output levels in response to respective ones of the 4 possible 2-bit input data values (each level being a voltage value defined in specific units):

| Input value | Output level |
|---|---|
| 11 | +1 |
| 10 | +0.5 |
| 01 | −0.5 |
| 00 | −1 |

Thus, output levels of +1 are continuously produced from each of the D/A converters 4 and 5 during each burst interval. Between the burst intervals, each of the D/A converters 4 and 5 produces level values from among the set +1, +0.5, −0.5 and −1, with a specific combination of two levels being produced in response to each 4-bit data value read out from the memory 30.

The two multi-level analog signals produced from the D/A converter 4 and 5 are then subjected to frequency band limiting by respective low pass filters 7 and 8 within a modulator section 6. The resultant band-limited multi-level analog signals produced from the LPFs 7 and 8 are then applied to a quadrature bi-phase modulator 9 within the modulator section 6, to execute QAM modulation of a carrier that is produced from the carrier generating circuit 10.

FIG. 2(A) illustrates the frequency band of each of the band-limited baseband multi-level analog signals that are outputted from the LPFs 7 and 8. The upper limit $f_M$ of this frequency band is lower than both the clock frequency $f'_{CK}$ and the carrier frequency $f_{CR}$, while in addition $f_{CR}$ in this example is slightly lower than $f'_{CK}$. The frequency band of the QAM signal produced by the quadrature bi-phase modulator 9 is shown in FIG. 2(B). As shown, this extends from an upper limit $f'_m$ ($=f_M+f_{CR}$) to a lower limit of ($f_{CR}-f_M$).

Figure 4:
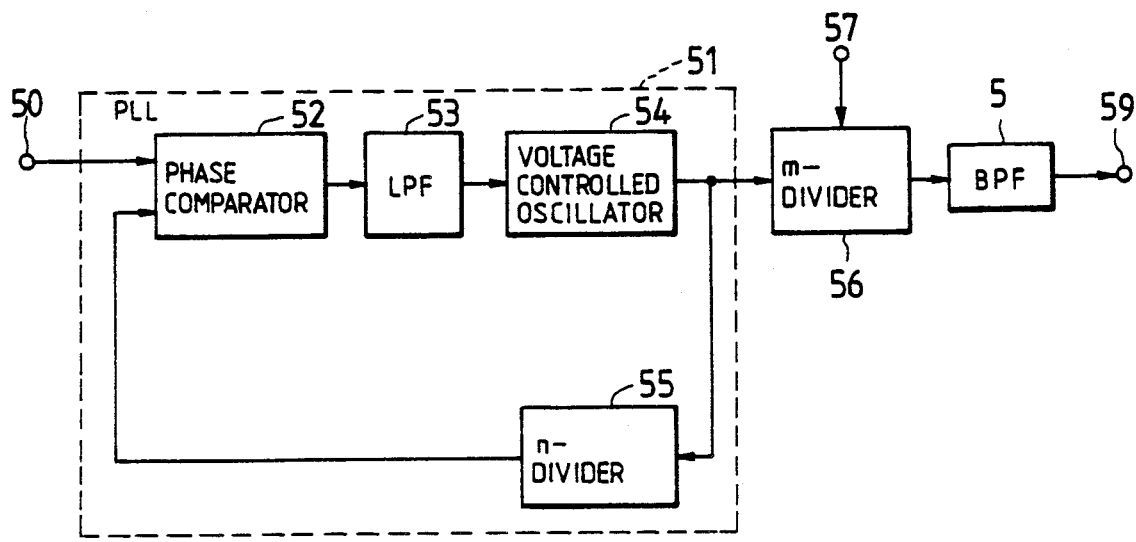
FIG. 4 is a block circuit diagram of a carrier generating circuit in the embodiment of FIG. 1.

FIG. 4 is a block circuit diagram of a specific configuration for the carrier generating circuit 10. The clock signal $S'_{CK}$ and the burst timing signal that are respectively produced from the burst insertion circuit 3 as described hereinabove are applied to input terminals 50, 57. The clock signal is then applied to one input of a phase comparator 52 within a PLL 51, the PLL 51 further consisting of an LPF 53, a VCO 54, and a frequency divider 55 which executes division by the factor n. The output signal from the factor-n frequency divider 55 is applied to the other input of the phase comparator 52, and the phase error signal produced from the phase comparator 52 is transferred through the LPF 53 to apply a frequency control voltage to the VCO 54. The operating frequency of the VCO 54 output signal is thereby set as $n.f'_{CK}$, and this signal is applied to a frequency divider 56 which divides by the factor m. The frequency divider 56 is implemented as a resettable counter having the burst timing signal applied to a reset input, and which responds to each burst timing pulse by being reset to an initial count condition, to be thereby periodically reset with the fixed burst period T. The frequency divider 56 produces an output signal at frequency $(n/m).f'_{CK}$, i.e. at the requisite frequency for the carrier as described above. The carrier which is thereby obtained is filtered by a BPF (band pass filter) 58 and supplied to an output terminal 59.

Figure 5:
FIG. 5 shows waveforms in the circuit of FIG. 4.
Figure 5:
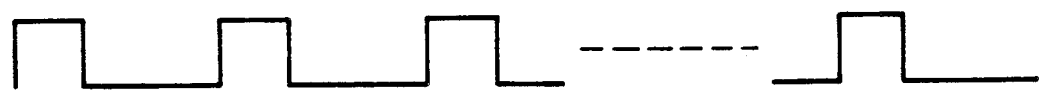
Figure 5:
Figure 5:
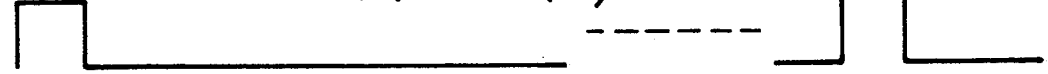

The timing relationships of the signals in the circuit of FIG. 4 are illustrated in FIG. 5. FIG. 5(A) shows the timing of the output signal from the VCO 54, FIG. 5(B) shows the clock signal of frequency $f'_{CK}$, FIG. 5(C) shows the carrier that is produced from the output terminal 59, and FIG. 5(D) shows the burst timing signal pulses from the burst timing counter 36. Due to the periodic resetting of the factor-m frequency divider 56 by the burst timing signal pulses, the clock signal $S'_{CK}$ and the carrier periodically coincide in phase, with the fixed burst period T. This fact is utilized during playback to enable the clock signal and carrier to be recovered together, as described hereinafter.

Figure 6A:
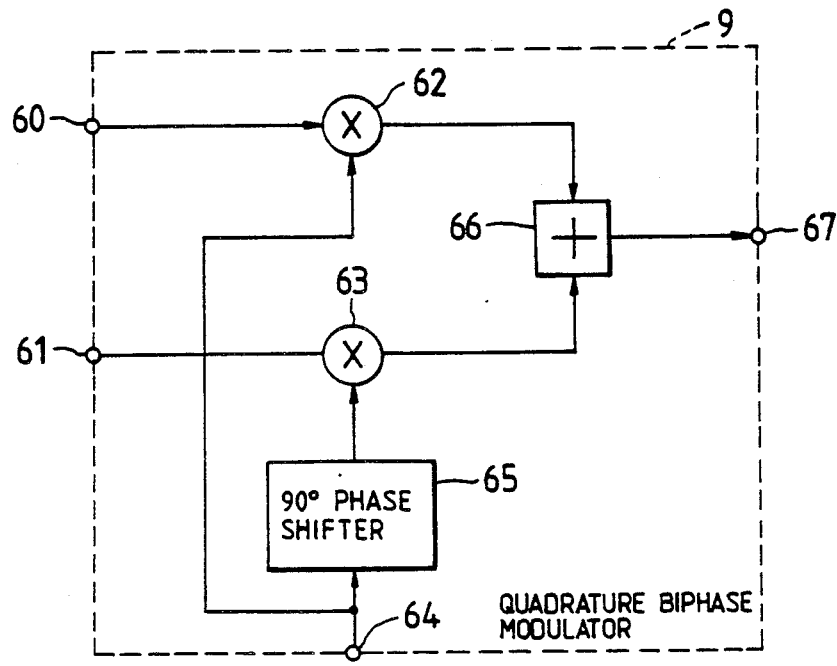
FIGS. 6(A) and 6(B) are circuit diagrams of a quadrature bi-phase modulator and a synchronous detection circuit in the embodiment of FIG. 1, respectively.

A block circuit diagram of the quadrature bi-phase modulator 9 is shown in FIG. 6(A). The basic operation will be described designating the carrier that is produced from the carrier generating circuit 10 as a time function $C(t)=A. \cos \omega ht$ (where $\omega$ is $2\pi.f_{CR}$) and designating the output multi-level analog signals from LPFs 7 and 8 as signals d1(t) and d2(t) respectively each of which can attain N different levels, where N is an arbitrary positive integer (which in this embodiment is 4. The signals d1(t) and d2(t) are applied from terminals 60, 61 of the quadrature bi-phase modulator 9 to inputs of respective multipliers 62 and 63. The carrier C(t) is applied from a terminal 64 directly to one input of the multiplier 62 and through a 90° phase shifter 65 to an input of the multiplier 63. In this way the signal d1(t) and the reference (i.e. in-phase) carrier are multiplied together, while the signal d2(t) and the 90° phase-shifted (i.e. quadrature) carrier are multiplied together. The resultant modulated outputs from the multiplier 62 and multiplier 63 are added together in an adder 66, so that a QAM signal S(t) is obtained as an output from the adder 66 and is supplied to an output terminal 67. This QAM signal S(t) can be expressed as:

$$S(t) = d1(t) \cdot A \cdot \cos \omega ht + d2(t) \cdot A \cdot \sin \omega ht$$

where $\omega$ is $2\pi \cdot f_{CR}$. Since 16 combinations of pairs of levels of the 4-level analog signals from LPFs 7 and 8 can occur, the QAM signal S(t) can attain 16 different signal states, each expressible as a phasor.

As described in the above, respective fixed "1" state data values are successively applied to the D/A converters 4 and 5 of the encoder section 2 during each of the burst intervals. Thus during each burst interval the signals d1(t) and d2(t) are each fixed at the +1 level. Hence, the output signal from the modulator 9 will be the sum of the in-phase and quadrature carriers, i.e. during each burst interval the QAM signal will be at the carrier frequency, fixed in phase at a value which is advanced by 45° from the reference 0° carrier phase angle, and with a fixed amplitude which is $\sqrt{2}$ times the amplitude of the carrier that is supplied to modulator 9.

Referring again to FIG. 1, the output from the quadrature bi-phase modulator 9 is applied to one input of an adder 12 in a bias section 11. A high-frequency bias signal produced from a bias signal generating circuit 13 is applied to the other input of the adder 12. The bias signal frequency $f_B$ is related to the upper limit $f_{MC}$ of the QAM signal frequency band (shown in FIG. 2(B)) as $f_B > 3 \cdot f_{MC}$. Due to this relationship it is impossible for an intermodulation frequency component $(f_B - f_x)$ to arise which will fall within the frequency band of the QAM signal, where $f_x$ is any arbitrary frequency that is within the QAM signal frequency band. Intermodulation distortion is thereby prevented.

With a magnetic recording system, it is possible to define an overall S/N ratio, which is a combination of the S/N ratio resulting from noise within the recording frequency band and an S/N ratio resulting from residual distortion within the recording frequency band (considering the power level of the distortion as a noise level). The level of the bias signal current which is introduced by the adder 12 is therefore set to an optimum value which will maximize this overall S/N ratio. This optimum value arises due to the fact that although an increase in the bias current level will provide improved linearity of the magnetic recording system, increasing bias current also results in deterioration of the recording frequency characteristic and a lower of the S/N ratio of the recording and playback system.

The output QAM recording signal $S_R$ produced from the bias section 11 is supplied to a magnetic recording head 15 of a magnetic recording/playback section 14, to be recorded on a magnetic tape 16. It should be noted that although this embodiment utilizes magnetic tape, the invention is of course equally applicable to other forms of magnetic recording medium such as magnetic discs.

During playback, the signal that has been recorded on the magnetic tape 16 is reproduced by a magnetic playback head 17. It is of course possible for a single magnetic head to perform the functions of both of heads 15 and 17. The resultant playback signal is then transferred through an equalizer circuit 18, which enhances high frequency components of the playback signal to compensate for attenuation of these components in the magnetic recording and playback process, to thereby render a flat overall frequency response characteristic for the magnetic recording and playback system (i.e. consisting of the heads 15, 17 and the tape 16). The equalized playback signal from the equalizer circuit 18 is then inputted to a carrier recovery circuit 19 and a demodulator section 20. The carrier recovery circuit 19 produces a recovered carrier, which is supplied to the demodulator section 20, and a recovered clock signal and burst timing signal, which are supplied over lines 19a and 19b respectively to the decoder section 24.

Figure 7:
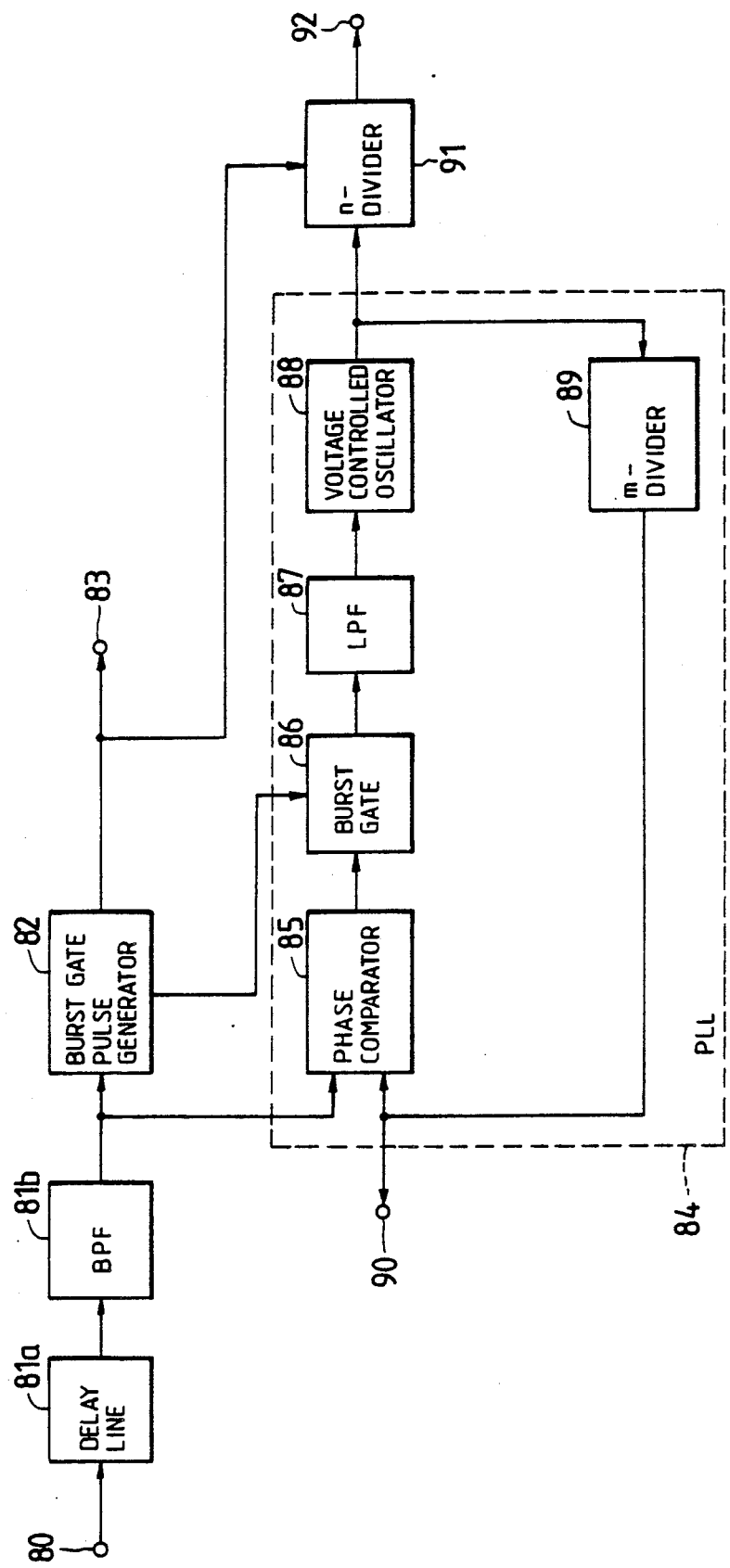
FIG. 7 is a block circuit diagram of a carrier and clock signal recovery circuit in the embodiment of FIG. 1.

FIG. 7 is a block circuit diagram of the carrier recovery circuit 19 of this embodiment. The output signal from the equalizer circuit 18 is applied from an input terminal 80 through a BPF (band pass filter) 81a which passes only the carrier frequency component. The carrier burst contained in the playback QAM signal are thereby separated. Since the carrier within each burst differs in phase by 45° from the "in phase" carrier condition as described hereinabove, the separated carrier burst must be delayed in phase by 45°, by a delay line 81b. The resultant phase-adjusted carrier bursts are then supplied to a burst gate pulse generator 82 and to a comparison input of a phase comparator 85 in a PLL 84. The burst gate pulse generator 82 responds to each of the separated carrier bursts to produce a corresponding burst gate pulse which extends for the duration of the burst interval, and a recovered burst timing pulse which occurs at the same fixed time point following the start of the burst as for the burst timing pulses of the recording system described hereinabove. Thus, the recovered burst timing pulses occur periodically with the fixed burst period T. The burst gate signal is supplied to a burst gate 86 of the PLL 84, to a reset input of a factor-n frequency divider 91, and to an output terminal 83. The PLL 84 further includes an LPF 87, and a VCO 88 whose output is frequency divided by a factor-m frequency divider 89, whose output is applied to the other comparison input of the phase comparator 85. The output signal from the BPF 81 is compared in phase with the output signal from the factor-m frequency divider 89 by the phase comparator 85, and during each burst interval the resultant phase error signal from the phase comparator 85 is transferred through the burst gate 86 to the LPF 87. Unnecessary high frequency components of the error signal are thereby removed, to provide a control voltage that is applied to control the operating frequency of the VCO 88. The output signal from the factor-m frequency divider 89 is thus held at the phase and frequency ($f_{CR}$) of the carrier bursts, i.e. a recovered carrier is produced from the factor-m frequency divider 89, and applied to an output terminal 90. In addition, since the frequency of the output signal from the VCO 88 is equal to $m \cdot f_{CR}$, and that signal is frequency divided by a factor n in the factor-n frequency divider 91, the output frequency from the factor-n frequency divider 91 is $(m/n) \cdot f_{CR}$, i.e. a clock signal of frequency $f_{CK}$ is recovered, and supplied to an output terminal 92.

The factor-n frequency divider 91 is periodically reset by each burst timing pulse from the burst gate pulse generator 82, so that the phase relationship between the recovered carrier and clock signal is fixed as the relationship shown in FIGS. 5(B), (C) described hereinabove That is, the recovered carrier and clock signal periodically attain mutual phase coincidence, with the fixed burst period T, at corresponding points on the time axis with respect to the playback signal to those for the original carrier, clock signal $S'_{CK}$ and recording signal. Thus, the recovered clock signal is correctly phase-related to the recovered carrier, and so can be used to accurately control A/D conversion of the demodulated QAM playback signal by the A/D converters 25 and 26.

Figure 6B:
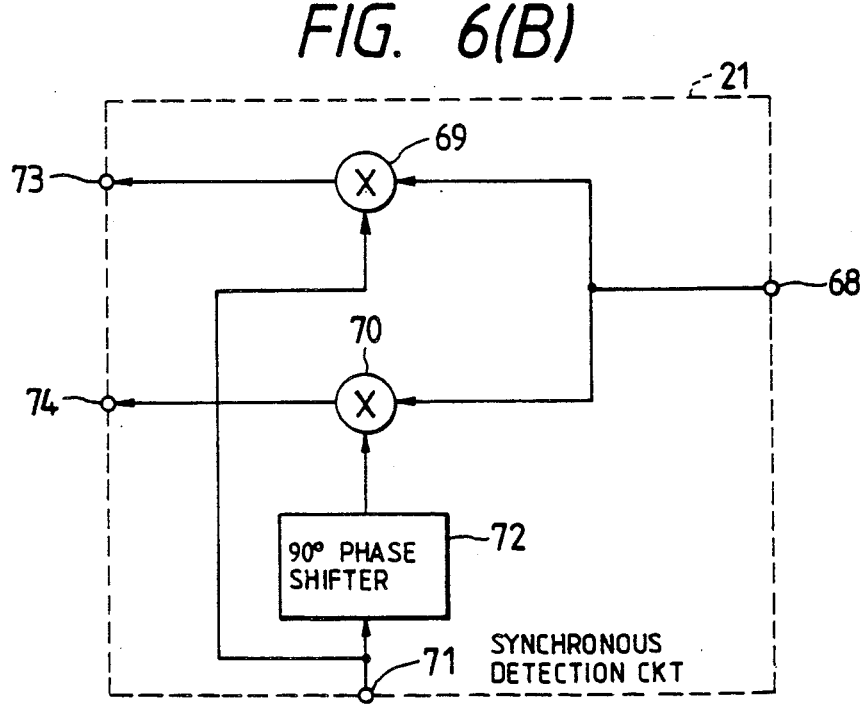

In FIG. 1, the synchronous detection circuit 21 within the demodulator section 20 receives the playback signal from the equalizer circuit 18, and also the recovered carrier from the carrier recovery circuit 19, for executing synchronous detection of the playback QAM signal. FIG. 6(B) is a block circuit diagram of a specific configuration for the synchronous detection circuit 21. The playback QAM signal is applied from an input terminal 68 to respective inputs of multipliers 69 and 70, while the recovered carrier is supplied from an input terminal 71 directly to an input of the multiplier 69 and through a 90° phase shifter 65 to an input of the multiplier 70. The playback signal and the direct (in-phase) carrier are thereby multiplied together in the multiplier 69, while the playback signal and the phase-shifted (quadrature) carrier are multiplied together in the multiplier 70, so that demodulated signals respectively corresponding to the two multi-level analog signals which were originally recorded as a QAM signal are produced from the multiplier 69 and multiplier 70 respectively, and transferred to output terminals 73 and 74.

These demodulated output signals from the synchronous detection circuit 21 are supplied to LPFs 22 and 23 respectively of the demodulator section 20, which, in conjunction with the LPFs 7 and 8 of the modulator section 6, determine the overall low pass filter shaping that is applied to the baseband recording and playback signals, i.e. determine the roll-off factor of the overall recording/playback frequency response characteristic. This roll-off factor is selected such as to minimize inter-symbol interference. The output signals from the LPFs 22 and 23 are supplied to A/D (analog-to-digital) converters 25 and 26 of a decoder section 24, which execute A/D conversion under timing control of the recovered clock signal, supplied from the carrier recovery circuit 19. Two parallel 2-bit signals are thereby produced from the A/D converters 25, 26 respectively, corresponding to the original 2-bit signals which are supplied to the D/A converters 4 and 5 of the encoder section 2. These 2-bit signals are then inputted to a burst elimination circuit 27, in which the data values which had been inserted in each burst interval by the burst insertion circuit 3 as described hereinabove (for causing the carrier bursts to be generated) are removed, and a 4-bit parallel digital signal is produced having an identical symbol frequency to the original digital signal that was supplied to the encoder section 2. This output digital 4-bit parallel signal is outputted from terminals 28a.

Figure 8:
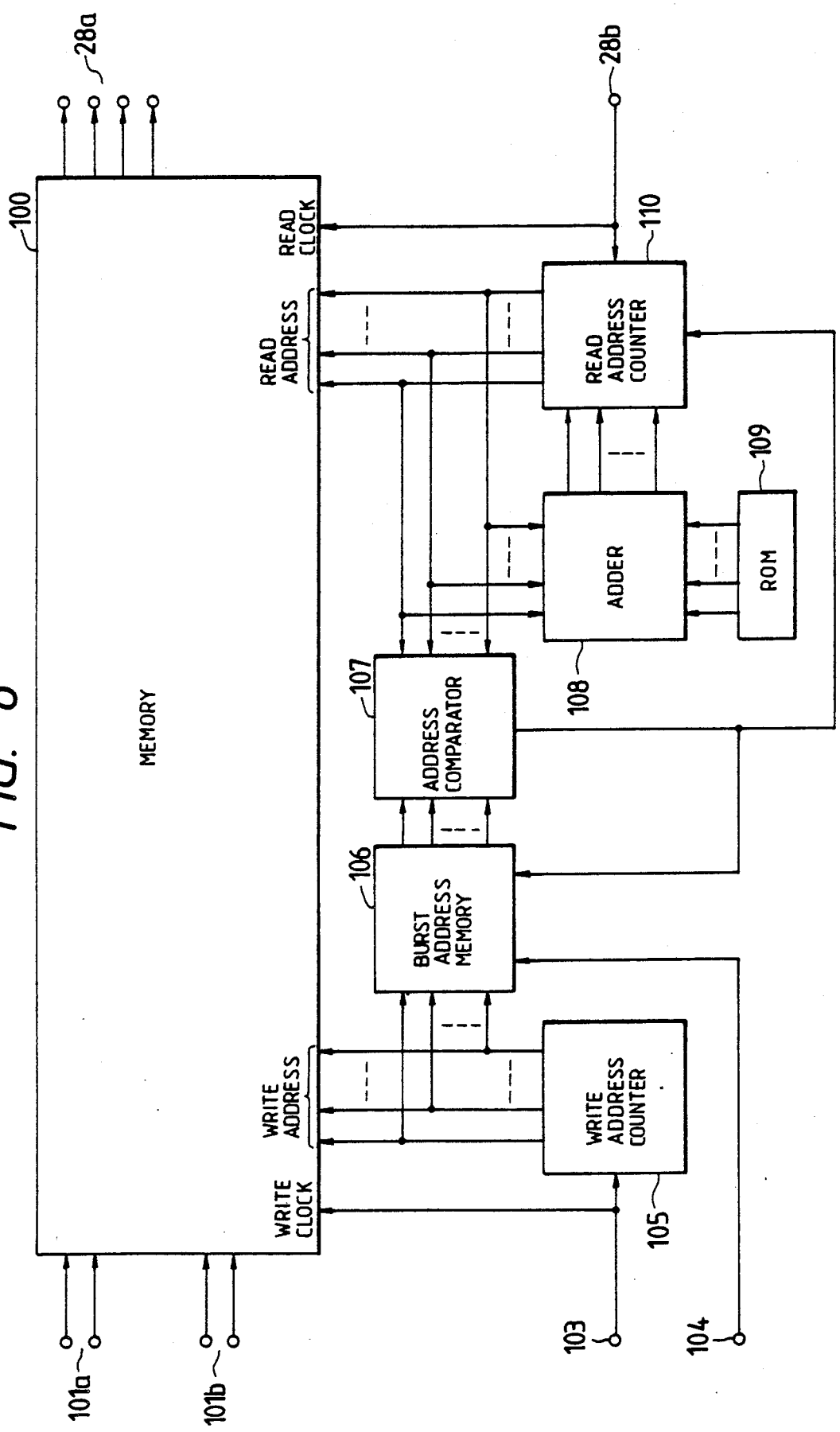
FIG. 8 is a block circuit diagram of a burst elimination circuit in the embodiment of FIG. 1.

FIG. 8 is a block circuit diagram of a specific configuration for the burst elimination circuit 27 of FIG. 1. The two 2-bit parallel digital signals from the A/D converters 25, 26 respectively are supplied via input terminal pairs 101a, 101b to be stored as successive data values in a memory 100. The recovered clock signal is applied from an input terminal 103 to a "write address" counter circuit 105, and is also applied as a "write clock" signal to the memory 100. Successive write address values are produced from the "write address" counter circuit 105 and are supplied to a set of write address inputs of the memory 100, and also to a burst address memory 106. The burst timing signal produced from the carrier recovery circuit 19 as described hereinabove is supplied from an input terminal 104 as a control signal to the burst address memory 106. A "read clock" signal, e.g. having a frequency that is identical to that of the original "write clock" signal $S_{CK}$ applied to the encoder section 2, is supplied from an external source to a "read clock" input of the memory 100 and also to "read address" counter circuit 110. An address comparison circuit 107 compares the addresses which are produced from the "read address" counter circuit 110 with an address which has been stored in the burst address memory 106, and which is the address at which an initial data value of the aforementioned set of fixed data values defining a burst interval has been stored in the memory 100. A ROM 109 has stored therein a value representing the duration of the aforementioned fixed data values of a burst interval (i.e. representing the number of successive memory addresses in which the burst data values are stored). This value stored in the ROM 109 is added to each of the current addresses that are being produced from the "read address" counter circuit 110, by an adder 108, and the resultant address is supplied to a set of parallel data inputs of the "read address" counter circuit 110.

The operation of circuit 27 is as follows. Successive 2-bit digital values from the A/D converters 25, 26 are successively stored, as combined 4-bit digital values, in addresses of the 100 that are determined by successive address values produced from the "write address" counter circuit 105, with the write operations being synchronized by the recovered clock signal. When a burst timing signal pulse occurs, indicating the start of a burst interval in the playback signal, the current value of write address is stored in the burst address memory 106. The 4-bit digital values stored in the memory 100 are successively read out at timings synchronized with the "read clock" signal, from addresses determined by the "read address" counter circuit 110. When the address comparison circuit 107 detects that the current address being produced from the "read address" counter circuit 11 is identical to the address that has been stored in the burst address memory 106, an output signal is produced from the address comparison circuit 107, and applied to the "read address" counter circuit 110 such as to load the output address from the adder 108 into the "read address" counter circuit 110 as a new address value. In this way, the addresses in which the fixed data values of a burst interval have been written will be skipped, so that these data values are excluded from the digital data read out from the memory 100. Burst removal is thereby achieved.

Figure 9:
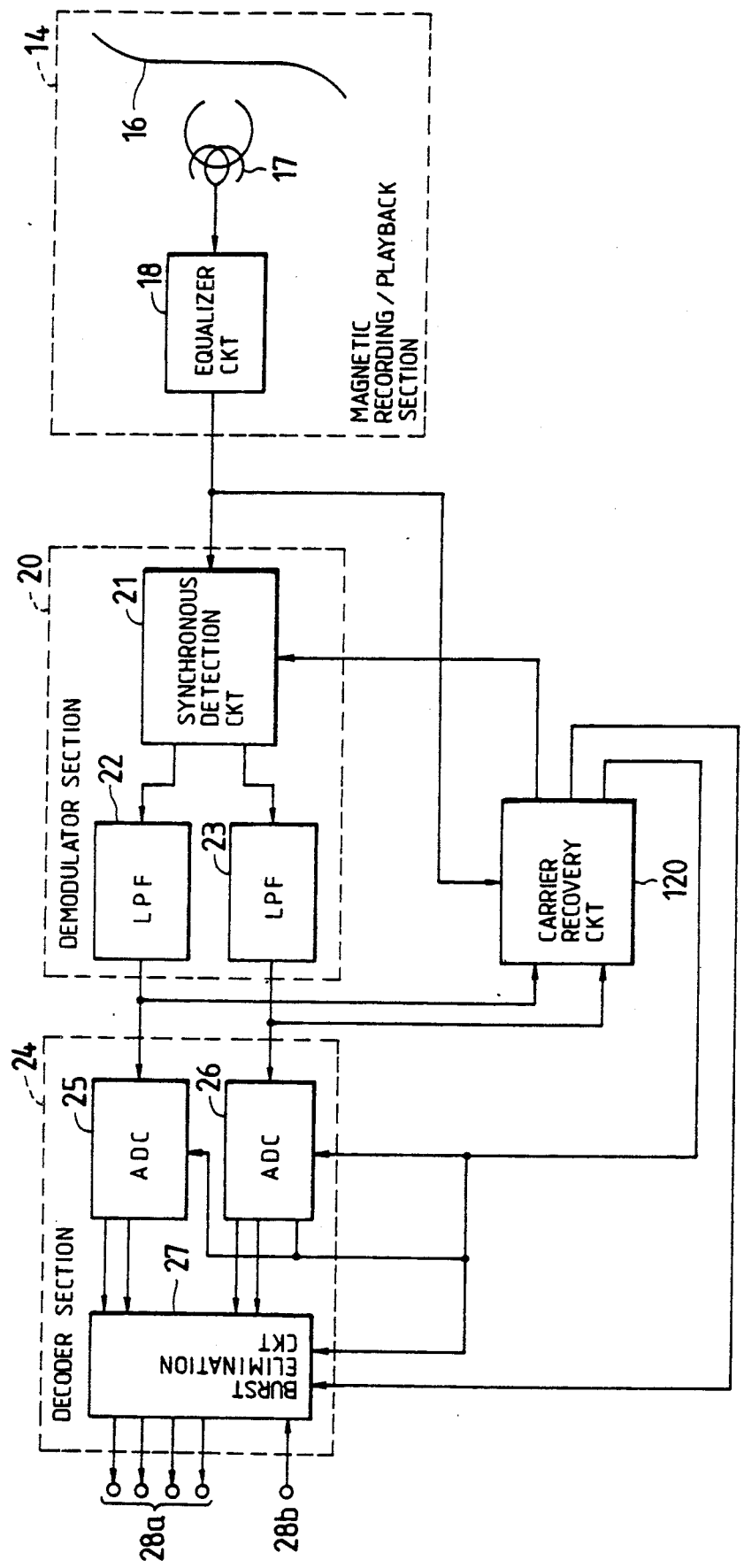
FIG. 9 is an overall block circuit diagram of a second embodiment of a digital signal magnetic recording and playback apparatus according to the present invention.

FIG. 9 is a general block circuit diagram of a playback system for a second embodiment of a digital signal magnetic recording and playback apparatus according to the present invention. This embodiment differs from the first embodiment described above only with respect to a circuit which is utilized in the playback system for recovering the carrier and clock signals from the playback signal, so that only this circuit will be described in the following. In the second embodiment, phase control of the recovered carrier is executed based upon the demodulated signals produced from LPFs 22 and 23, rather than upon the phase within each carrier burst as in the first embodiment. The carrier recovery circuit utilizes a known form of the Costas loop circuit which has been adapted for carrier recovery from demodulated QAM signals, with the addition to the known circuit of components for deriving a clock signal which is related to the recovered carrier as $f_{CR} = f_{CK} \cdot (n/m)$ as described hereinabove for the first embodiment, and for deriving burst timing signal pulses. Since such a modified Costas circuit for QAM operation is known in the art, detailed description of the operation will be omitted. Basically, designating an amount of phase shift of the current state of the playback QAM signal relative to the reference 0° carrier phase angle as $\theta_c$, a phase error quantity is derived which is proportional to $\sin 4\theta_c$. Assuming that the modulation component of this phase shift is 45° or a multiple of 45°, $\sin 4\theta_c$ will be zero when there is no phase error superimposed on the modulation component. This fact enables the aforementioned phase error quantity to be used for feedback control of the recovered carrier frequency. There are actually 12 possible modulation phase angles of a 16-value QAM signal relative to carrier reference 0°. However correct operation is ensured by applying the phase error quantity to control the recovered carrier frequency only under a condition in which the modulation phase shift is $\pm 45°$ or $\pm 135°$. More precisely, when the QAM signal phase angle differs from the reference (0°) carrier phase value by an amount which is not within one of a set of predetermined ranges, each of the ranges being equidistant from the I and Q carrier phase axes, then the phase error signal that is derived during that condition is inhibited from affecting the recovered carrier frequency.

Figure 10:
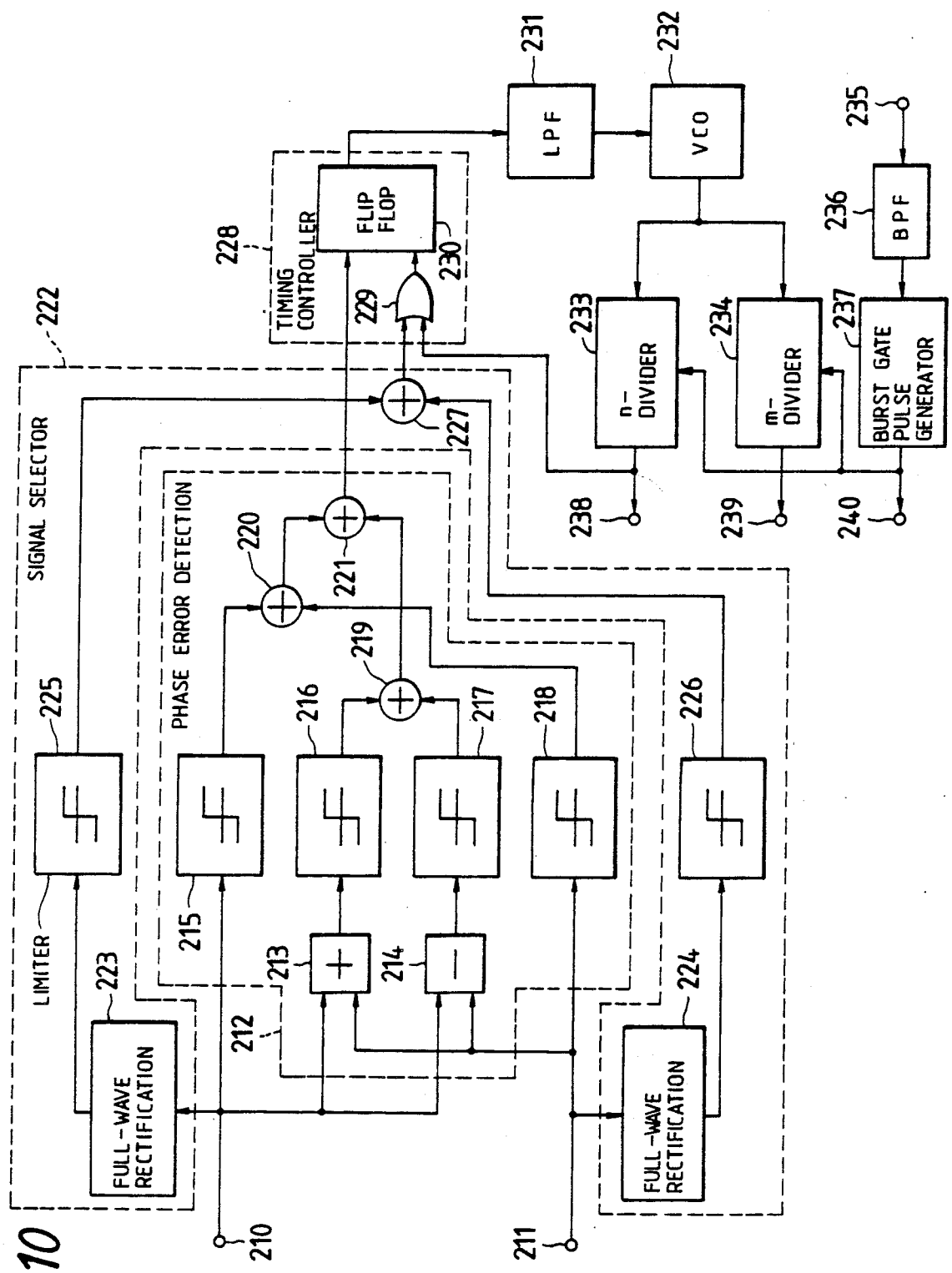
FIG. 10 is a block circuit diagram of a carrier and clock signal recovery circuit in the embodiment of FIG. 9.
Figure 11:
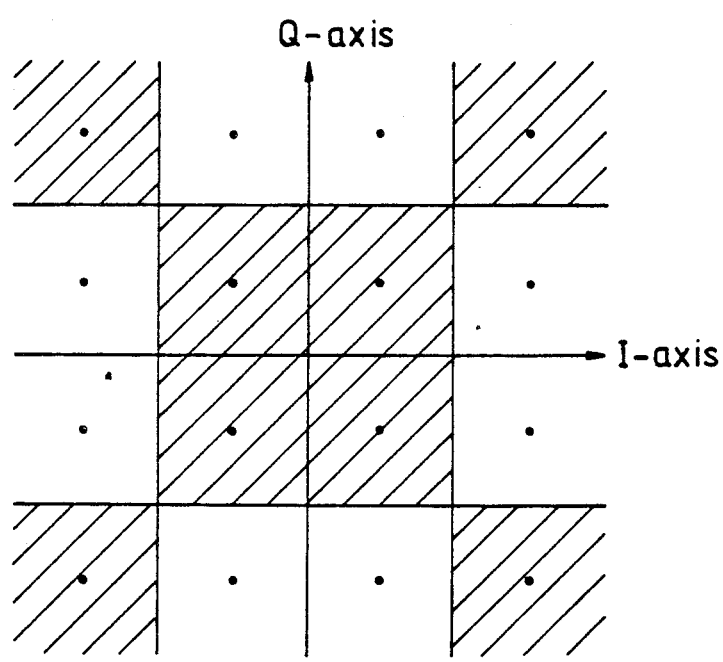
FIG. 11 is a diagram of a QAM signal constellation, for describing the operation of a signal selector section in the circuit of FIG. 10.

In FIG. 9, a carrier and clock recovery circuit 120 receives as input signals the demodulated multi-level analog signals produced from the LPFs 22 and 23 respectively, and produces as outputs a recovered carrier which is supplied to the synchronous detection circuit 21, a recovered clock signal that is supplied to the decoder 24, and a recovered burst timing signal that is also supplied to the decoder 24. The Costas loop circuit is formed of the carrier and clock recovery circuit 120 in conjunction with the synchronous detection circuit 21 and the LPFs 22 and 23. FIG. 10 shows a block circuit diagram of the carrier and clock recovery circuit 120. FIG. 11 shows the signal constellation of a 16-value QAM signal, in which the positive-going horizontal and vertical axes correspond to the reference in-phase (I) and quadrature phase (Q) carrier phase, and in which the respective points correspond to each of the possible phase/amplitude states of the QAM signal, in the absence of phase jitter.

In FIG. 10, the output signals from LPFs 22 and 23 are applied from input terminals 210, 211 to inputs of a phase error detection circuit 212 and a signal selector circuit 222. The selector circuit 222 consists of full-wave rectifiers 223 and 224, limiters 225 and 226, and an exclusive-OR gate 227. The circuit 222 produces an output at the "L" (low) logic level to an OR gate 229 of a timing controller circuit 228 only under a condition in which the state of the QAM signal corresponds to one of the positions shown within the hatched-line portions of FIG. 11, i.e. only when the phase of the playback QAM signal is approximately equidistant from the I (in-phase) and Q (quadrature) axes. The phase error detection circuit 212 consists of an adder 213, a subtractor 214, limiters 215, 216, 217 and 218, and exclusive-OR gates 219, 220 and 221. The limiters 215 to 218 function to remove the amplitude information from the multi-level analog signals that are inputted to the phase error detection circuit 212, to produce respective signals containing only phase information. An output pulse train is thereby produced from exclusive-OR gate 221 of the phase error detection circuit 212, whose phase varies in accordance with phase error of the recovered carrier that is applied to the synchronous detection circuit 21. The timing controller circuit 228 consists of a flip-flop 230 in addition to the OR gate 229. An output pulse train produced from the flip-flop 230 are transferred through a low-pass filter (loop filter) 231 to produce a control voltage to control the frequency of operation of a VCO 232. The output signal from the VCO 232 is frequency divided by a factor-n frequency divider 233 and a factor-m frequency divider 234. The carrier bursts contained in the playback QAM signal, supplied from the equalizer 18 to an input terminal 235, are separated by a band pass filter 236, and supplied to a burst gate pulse generating circuit 237, whereby a burst timing signal pulse is produced from the burst gate pulse generating circuit 237 in synchronism with each carrier burst. These burst timing signal pulses are applied to respective reset inputs of the factor-n frequency divider 233 and factor-m frequency divider 234. The output signal from the factor-n frequency divider 233 is applied to the other input of the OR gate 229 of the timing controller circuit 228. The output from the phase error detection circuit 212 is applied to a "set" input of the flip-flop 230, and the output from the OR gate 229 to a "reset" input.

With this circuit, the recovered clock signal is produced from the factor-n frequency divider 233, and the recovered carrier is produced from the factor-m frequency divider 234 and supplied from a terminal 238 to the synchronous detection circuit 21. The phase error quantity used for frequency control is an amount of time-axis shift of pulses produced from the exclusive-OR gate 221, with the flip-flop 230 being successively set by leading edges of these pulses. Under a condition in which there is zero phase error of the recovered carrier, the phase error detection circuit 212 produces a train of pulses which differ in phase by 180° from the recovered clock signal produced from the factor-n frequency divider 233, so that the output from the flip-flop 230 is a train of pulses having a 50% duty ratio when the phase error of the recovered carrier is zero. Phase compensation is thereby applied by the VCO control signal that is produced from the LPF 231, to control the phase of the recovered carrier. The relationship $f_{CR} = (n/m) \cdot f_{CK}$ is established by the division ratios of dividers 233 and 234. Furthermore, due to these frequency dividers being periodically reset at the start of each burst interval, the phase relationship between the recovered carrier, clock and burst timing signals will be established as that shown in FIG. 5 and described hereinabove. The recovered carrier, clock and burst timing signals are respectively supplied from terminals 239, 238 and 240 to the synchronous detection circuit 21 and the decoder section 24, whose burst elimination circuit 27 functions identically to that of the first embodiment described hereinabove.

Use of such a Costas loop circuit for carrier recovery has the advantage of providing greater phase accuracy for the recovered carrier, in the presence of time-axis deviations (i.e. phase jitter) resulting from the recording/playback process, by comparison with the carrier recovery method used in the first embodiment.

Although a Costas loop circuit has been described above for the case of a 16-value QAM signal, the circuit could in general be modified for carrier recover from an N-value QAM signal.

Various changes and modifications to the embodiments of the invention described hereinabove could be envisaged, which fall within the scope claimed for the invention. For example, it is possible to include an error correction code in the recording signal, using convolutional coding, by using a greater number of levels for the multi-level analog signals, and to use a Viterbi decoder upon playback to execute decoding of the playback multi-level analog signals. This would enable a reduction in the maximum permissible S/N ratio for the recording/playback system, so that a higher recording bit rate and hence even greater efficiency of utilizing the system recording/playback frequency bandwidth could be attained.

Furthermore although the invention has been described for the case of quadrature amplitude modulation being utilized to produce a recording signal, it would also be possible to utilize other modulation methods such as amplitude phase shift keying (APSK), phase shift keying (PSK), frequency shift keying (FSK), etc, with comparable results being attainable.

Although the present invention has been described hereinabove on the assumption that the carrier frequency $f_{CR}$ is made lower than the second clock frequency $f'_{CK}$, the invention would be equally applicable to the case in which the carrier frequency and second clock frequency are made identical.

What is claimed is:

1. A digital signal magnetic recording and playback apparatus coupled to receive a first digital signal expressing successive data values and a first clock signal synchronized with said data values, comprising:

means for time-axis compressing said input digital signal to a second digital signal having fixed data values inserted by time division multiplexer during each of periodically occurring burst intervals, said burst intervals occurring with a fixed burst period (T), for producing a second clock signal having a frequency ($f'_{CK}$) and synchronized with said data values of said second digital signal, and for generating burst gate pulses respectively coinciding with said burst intervals;

means for converting each of successive data values of said second digital signal to two multi-level analog signals;

carrier generating means responsive to said second clock signal and said burst gate pulses for generating a carrier which is phase locked with said second clock signal, said carrier having a frequency ($f_{CR}$) which is fixedly related to said second clock signal frequency ($f'_{CK}$) as $f_{CR}=(n/m) \cdot f'_{CK}$, where n and m are respective positive integers and n is less than m, including means for setting said carrier to a specific phase at a fixed time-axis position within each of said burst intervals, when said second clock signal also attains said specific phase;

means for executing quadrature amplitude modulation of said carrier by said two multi-level analog signals to produce a quadrature amplitude modulation signal as a recording signal;

magnetic recording and playback means for recording said recording signal and subsequently reproducing a corresponding playback signal;

carrier recovery circuit means coupled to receive said playback signal, for deriving recovered burst gate pulses, a recovered carrier and a recovered second clock signal having a frequency which is (m/n) times that of said recovered carrier, including means for setting said recovered second clock signal to said specific phase at said fixed time-axis position within each of said recovered burst gate pulses;

demodulator means utilizing said recovered carrier for demodulating said playback signal to obtain two recovered multi-level analog signals; and decoder means coupled to receive the two recovered multi-level analog signals and said recovered second clock signal, for converting said demodulated signals to a recovered second digital signal, and for processing said recovered second digital signal to obtain an output digital signal expressing only said data values of the input digital signal.

2. A recording and playback apparatus according to claim 1, wherein said carrier generating means comprise:

a first phase locked loop circuit, synchronized by said second clock signal, for producing an output signal having a frequency that is n times that of said second clock signal; and a factor-m frequency divider for frequency dividing said output signal from the first phase locked loop circuit by said integer value m, for producing said carrier, and means for resetting said factor-m frequency divider to a predetermined initial state by said burst gate pulses at said fixed position in each of said burst gate pulses;

and wherein said carrier recovery circuit means includes means for deriving separated carrier bursts from said playback signal and for deriving recovered burst gate pulses from said separated carrier bursts; and a second phase locked loop circuit synchronized by said separated carrier bursts for producing a recovered carrier and an output signal having a frequency that is m times that of said recovered carrier, a factor-n frequency divider circuit for frequency dividing said output signal by said integer value n to obtain a recovered clock signal having a frequency that is (m/n) times that of said recovered carrier, and means for resetting said factor-n frequency divider to said predetermined initialized condition at said fixed position in each of said recovered burst gate pulses.

3. A digital signal magnetic recording and playback apparatus coupled to receive a first digital signal expressing successive data values and a first clock signal synchronized with said data values, comprising:

means for time-axis compressing said input digital signal to a second digital signal having fixed data values inserted by time division multiplexer during each of periodically occurring burst intervals, said burst intervals occurring with a fixed burst period (T), for producing a second clock signal having a frequency ($f'_{CK}$) and synchronized with said data values of said second digital signal, and for generating burst gate pulses respectively coinciding with said burst intervals;

means for converting each of successive data values of said second digital signal to two multi-level analog signals;

carrier generating means responsive to said second clock signal and said burst gate pulses for generating a carrier which is phase locked with said second clock signal, said carrier having a frequency ($f_{CR}$) which is fixedly related to said second clock signal frequency ($f'_{CK}$) as $f_{CR}=(n/m)\cdot f'_{CK}$, where n and m are respective positive integers and n is less than m, including means for setting said carrier to a specific phase at a fixed time axis position within each of said burst intervals, when said second clock signal also attains said specific phase;

means for executing quadrature amplitude modulation of said carrier by said two multi-level analog signals to produce a quadrature amplitude modulation signal as a recording signal;

means for adding to said recording signal a high-frequency bias signal, prior to executing recording;

magnetic recording and playback means for recording said recording signal and subsequently reproducing a corresponding playback signal;

carrier recovery circuit means coupled to receive said playback signal, for deriving recovered burst gate pulses, a recovered carrier and a recovered second clock signal having a frequency which is (m/n) times that of said recovered carrier, including means for setting said recovered second clock signal to said specific phase at said fixed time axis position within each of said recovered burst gate pulses;

demodulator means utilizing said recovered carrier for demodulating said playback signal to obtain two recovered multi-level analog signals; and decoder means coupled to receive said two recovered multi-level analog signals and said recovered second clock signal, for converting said demodulated signals to a recovered second digital signal, and for processing said recovered second digital signal to obtain an output digital signal expressing only said data values of said input digital signal.

4. A digital signal magnetic recording and playback apparatus according to claim 3, wherein a value of bias current of said bias signal supplied to said addition means is selected as an optimum value for maximizing an overall signal/noise ratio of said digital signal magnetic recording and playback apparatus, where said overall signal/noise ratio is a combination of a level of noise generated in a playback signal obtained by said playback system, within a frequency bandwidth of said quadrature amplitude modulation signal and a level of equivalent noise generated in said playback signal, expressing a level of distortion produced within said quadrature amplitude modulation signal frequency bandwidth.

5. A digital signal magnetic recording and playback apparatus coupled to receive a first digital signal expressing successive data values and a first clock signal synchronized with said data values, comprising:

means for time-axis compressing said input digital signal to a second digital signal having fixed data values inserted by time division multiplexer during each of periodically occurring burst intervals, said burst intervals occurring with a fixed burst period (T), for producing a second clock signal having a frequency ($f'_{CK}$) and synchronized with said data values of said second digital signal, and for generating burst gate pulses respectively coinciding with said burst intervals;

means for converting each of successive data values of said second digital signal to two multi-level analog signals;

carrier generating means responsive to said second clock signal and said burst gate pulses for generating a carrier which is phase locked with said second clock signal, said carrier having a frequency ($f_{CR}$) which is fixedly related to said second clock signal frequency ($f'_{CK}$) as $f_{CR}=(n/m)\cdot f'_{CK}$, where n and m are respective positive integers and n is less than m, including means for setting said carrier to a specific phase at a fixed time axis position within each of said burst intervals, when said second clock signal also attains said specific phase;

means for executing quadrature amplitude modulation of said carrier by said two multi-level analog signals to produce a quadrature amplitude modulation signal as a recording signal;

magnetic recording and playback means for recording said recording signal and subsequently reproducing a corresponding playback signal;

means for separating said carrier bursts from said playback signal and for generating recovered burst gate pulses respectively coinciding with said separated carrier bursts;

a voltage controlled oscillator;

a frequency divider controlled to be reset to an initialized state at said fixed time axis position in each of said recovered burst gate pulses, for frequency dividing an output signal produced from said oscillator by said integer value m to thereby generate a recovered carrier;

a frequency divider controlled to be reset to said initialized state at said fixed time axis position in each of said recovered burst gate pulses, for dividing said output signal from said oscillatory by said integer value n, to thereby generate a recovered second clock signal;

a synchronous detector circuit for demodulating said playback signal by said recovered carrier to obtain two recovered multi-level analog signals;

a phase error detection circuit for deriving from respective phase values of said two recovered multi-value analog signals a phase error quantity, and for applying said phase error quantity to determine a frequency control voltage which is applied to said voltage controlled oscillator; and decoder means coupled to receive said two recovered multi-level analog signals and said recovered second clock signal, for converting said demodulated signals to a recovered second digital signal, and for processing said recovered second digital signal to obtain an output digital signal expressing only said data values of said input digital signal.

6. A digital signal magnetic recording and playback apparatus coupled to receive a first digital signal expressing successive data values and a first clock signal synchronized with said data values, comprising:

means for time-axis compressing said input digital signal to a second digital signal having fixed data values inserted by time division multiplexer during each of periodically occurring burst intervals, said burst intervals occurring with a fixed burst period (T), for producing a second clock signal having a frequency (f'$_{CK}$) and synchronized with said data values of said second digital signal, and for generating burst gate pulses respectively coinciding with said burst intervals;

means for converting each of successive data values of said second digital signal to two multi-level analog signals;

carrier generating means responsive to said second clock signal and said burst gate pulses for generating a carrier which is phase locked with said second clock signal, which has a frequency (f$_{CR}$) which is fixedly related to said second clock signal frequency (f'$_{CK}$) as f$_{CR}$=(n/m).f'$_{CK}$, where n and m are respective positive integers and n is less than m, and which attains phase coincidence with said second clock signal at a fixed time axis position within each of said burst intervals;

means for executing quadrature amplitude modulation of said carrier by said two multi-level analog signals to produce a quadrature amplitude modulation signal as a recording signal;

means for adding to said recording signal a high-frequency bias signal, prior to executing recording;

magnetic recording and playback means for recording said recording signal and subsequently reproducing a corresponding playback signal;

means for separating said carrier bursts from said playback signal and for generating recovered burst gate pulses respectively coinciding with said separated carrier bursts;

a voltage controlled oscillator;

a frequency divider controlled by said recovered burst gate pulses to be reset to an initialized state at said fixed time axis position within each of said burst gate pulses, for dividing an output signal produced from said oscillator by a factor equal to said integer m to thereby generate a recovered carrier;

a frequency divider controlled by said recovered burst gate pulses to be reset to said initialized state at said fixed time axis position within each of said burst gate pulses, for dividing said output signal from said oscillator by a factor equal to said integer n, to thereby generate a recovered second clock signal;

a synchronous detector circuit for demodulating said playback signal by said recovered carrier to obtain two recovered multi-level analog signals;

a phase error detection circuit for deriving from respective phase values of said two recovered multi-value analog signals a phase error quantity, and for applying said phase error quantity to determine a frequency control voltage which is applied to said voltage controlled oscillator; and decoder means coupled to receive said two recovered multi-level analog signals and said recovered second clock signal, for converting said demodulated signals to a recovered second digital signal, and for processing of said recovered second digital signal to obtain an output digital signal expressing only said data values of said input digital signal.

7. A recording and playback apparatus according to claim 6, wherein said bias signal has a frequency which is at least three times an upper limit frequency of a frequency bandwidth of said quadrature amplitude modulation signal.

8. A recording and playback apparatus according to claim 5 or 6, comprising means for inhibiting application of said phase error quantity to said frequency control voltage when the phase difference between the recording signal and a reference carrier phase value is outside any of a plurality of predetermined phase difference ranges.

* * * * *